United States Patent Office 3,126,340
Patented Mar. 24, 1964

3,126,340
METHOD OF INCREASING ALKALINITY OF COMPOSITIONS BY INCORPORATING ALKALINE EARTH METAL CARBONATES THEREIN
Albert Sabol, Munster, Eli W. Blaha, Highland, and George S. Curosh, Whiting, Ind., assignors to Standard Oil Company, Chicago, Ill., a corporation of Indiana
No Drawing. Filed Nov. 21, 1961, Ser. No. 154,070
10 Claims. (Cl. 252—18)

This invention relates to increasing the alkalinity of certain compositions by formation of alkaline earth metal carbonates dispersed therein.

It has been found desirable for use of materials in certain applications to increase the alkalinity of such materials. For example, alkaline earth metal neutralized detergency addition agents, useable in lubricants and particularly in lubricating oils for use in internal combustion engines, exhibit increased high temperature detergency generally with increased alkaline earth metals content. It has become increasingly more important in recent years, in order to more particularly suit the requirements of modern internal combustion engines, to increase the alkalinity of such detergency addition agents. Although methods for increasing such alkalinity have been proposed, none of such methods is as yet believed to be considered the ultimate solution.

Increasing the alkalinity of such detergency addition agents is commonly known as "overbasing." The highly desirable effect from overbasing is to obtain the carbonate, or sometimes other salt, of the alkaline earth metal in finely dispersed form within the composition. Although such overbasing is usually carried out using either barium or calcium, overbasing with calcium is especially difficult and it becomes particularly desirable to provide overbasing methods which are capable of utilizing calcium in the desired manner. Calcium neutralized and overbased detergents would probably be equally effective as replacements for barium neutralized and overbased products and in view of the lower cost for calcium compounds, economic advantages could be obtained. However, it has been difficult, if not impossible to obtain calcium-containing detergents having sufficient calcium present, e.g. in the form of calcium carbonate, to provide adequate high-temperature detergency for modern engines. Much difficulty has been encountered in working especially with inorganic basic calcium compounds in attempting to utilize calcium from such compounds to an acceptable extent; attempts to utilize calcium compounds often give discouraging results apparently due to some inability of the calcium compounds to react sufficiently during neutralization and overbasing procedures. For example, it has been extremely difficult to obtain a neutralized overbased product containing even one mole of calcium per mole of acidic component of calcium salt detergents.

It is an object of the present invention to provide a method for preparing high alkalinity alkaline earth metal-containing compositions. It is a more particular object of the present invention to provide a method for preparing overbased detergency addition agents for use in lubricants and especially for use in liquid lubricants,, e.g. for internal combustion engine crankcase applications. It is another object of this invention to provide overbased lubricating oil addition agents, as well as other high alkalinity compositions, having dispersed alkaline earth metal content. Of course, another object is to provide lubricating oils containing overbased detergency addition agents. In a more particular aspect, it is an object of this invention to provide an overbasing technique which increases especially calcium utilization in the overbasing procedure. Other objects, as well as advantages of the present invention, will become apparent to those having ordinary skill in the art from the following descriptions of this invention.

In accordance with the present invention, a method for increasing the alkalinity of a gas permeable alkaline earth metal oxide-miscible composition is provided. The method is carried out by treating a mixture of alkaline earth metal oxide and the gas permeable composition miscible therewith so as to transform the oxide in the mixture to the corresponding carbamate by reaction with gaseous carbon dioxide and ammonia. The carbamate is then decomposed to the alkaline earth metal carbonate. The carbonate is thereby generated in situ and finely dispersed throughout the composition.

In a particular aspect of the present invention, the composition treated so as to increase its alkalinity is an alkaline earth metal neutralized detergency addition agent and the process results in increasing the alkaline reserve of the addition agent. Accordingly, the neutralized detergent is treated in admixture with alkaline earth metal oxide and sufficient water to hydrolyze the oxide to the hydroxide to form the carbamate. The treatment is in the liquid phase at a temperature below the decomposition temperature of ammonium carbamate and the treatment is with gaseous ammonia and gaseous carbon dioxide. The carbon dioxide and ammonia apparently form ammonium carbamate dispersed within the mixture and the ammonium carbamate is converted by reaction with the alkaline earth metal hydroxide to the corresponding alkaline earth metal carbamate. Alkaline earth metal carbamate is then thermally decomposed in the presence of water or steam to produce finely divided suspendable alkaline earth metal carbonate within the detergency addition agent. The alkaline earth metal carbonate provides the alkaline reserve and thereby overbases the detergent.

The alkaline earth metal oxides are well known to those in the art and include the oxides of calcium, strontium and barium which are apparently converted to the hydroxide by hydrolysis during the present process. The oxide can be added to the reaction in combination with the water, i.e. as the hydroxide. Hydrates of such basic alkaline earth metal compounds are, of course, useable as are alkaline earth metal compounds capable of forming the oxide or hydroxide in situ within the reaction mixture.

In the preferred application where a detergent of high alkaline reserve is produced, the present process is particularly advantageous in obtaining a product having a high calcium content and in view of the general difficulties in utilizing calcium, the present process is especially effective where the alkaline earth metal is calcium.

Although the present process is applicable for formation of alkaline earth metal carbonate dispersed throughout any gas-permeable composition which is miscible with such alkaline earth metal oxide, the preferred gas permeable composition is a detergent. Other suitable gas-permeable compositions which can be processed in accordance herewith include a variety of liquid or solid or semi-solid substances, e.g. solid catalyst supports, adsorbent materials such as in adsorbent treating beds, lubricant grease compositions where finely divided calcium carbonate may be advantageous as a thickener, etc.

The detergents for use in accordance herewith can be solid or semi-solid such as the granulated or flake type washing detergents. However, the detergents are preferably predominantly liquid oil soluble detergency addition agents for use in lubricating oils such as the liquid oleaginous lubricating oils or the thickened or gelled grease-type lubricants such as those employing thickeners other than calcium carbonate. Especially preferred detergency addition agents, in view of their availability and common usage, are the neutralized alkaline earth metal sulfonates and the neutralized phosphorus sulfide-hydrocarbon reaction products (either hydrolyzed or non-hydrolyzed.) Because the gas-permeable composition does not enter into the chemical reaction of the present process, and because its presence as a physical substantially non-reactive substance, the particular gas-permeable composition is not critical. The preference for certain detergency addition agents is based upon the desirability of fulfilling the continuing need for high alkalinity lubricating oil detergents.

As an example of a preferred detergent, a phosphorus sulfide-hydrocarbon reaction product can be prepared by reacting a hydrocarbon with a phosphorus sulfide, such as $P_2S_3$, $P_4S_3$, $P_4S_7$, $P_2S_5$ or other phosphorus sulfide and preferably phosphorus pentasulfide.

The hydrocarbon substituent of this reaction is suitably a high boiling hydrocarbon such as is described in detail in U.S. 2,316,080, 2,316,082 and 2,316,088, each issued to Loane et al. on April 6, 1943. While the hydrocarbon constituent of this reaction can be any of the type hereinafter described, it is preferably a mono-olefin hydrocarbon polymer resulting from the polymerization of low molecular weight mono-olefinic hydrocarbons or isomono-olefinic hydrocarbons, such as butylenes or the copolymers obtained by the polymerization of hydrocarbon mixtures containing isomono-olefins and mono-olefins or mixtures of olefins in the presence of a catalyst, such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and iso-mono-olefin polymers having molecular weights ranging from about 150 to about 50,000 or more, and preferably from about 300 to about 10,000. Such polymers can be obtained, for example, by the polymerization in the liquid phase of a hydrocarbon mixture containing mono-olefins and isomono-olefins such as butylene and isobutylene at a temperature of from about −80° F. to about 100° F. in the presence of a metal halide catalyst of the Friedel-Crafts types such as, for example, boron fluoride, aluminum chloride, and the like. In the preparation of these polymers, we may employ, for example, a hydrocarbon mixture containing isobutylene, butylenes and butanes recovered from petroleum gases, especially those gases produced in the cracking of petroleum oils in the manufacture of gasoline.

Essentially paraffinic hydrocarbons such as bright stock residuums, lubricating oil distillates, petrolatums, or paraffin waxes, may be used. There can also be employed the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride and the like.

Other preferred olefins suitable for the preparation of the herein-described phosphorus sulfide reaction products are olefins having at least 20 carbon atoms in the molecule of which from about 13 carbon atoms to about 18 carbon atoms, and preferably at least 15 carbon atoms, are in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

The phosphorus sulfide-hydrocarbon reaction product is prepared by reacting the phosphorus sulfide, e.g. $P_2S_5$, with the hydrocarbon at a temperature of from about 150° F. to about 600° F., preferably from about 300° F. to about 500° F., using from 1% to about 50%, preferably from about 5% to about 25% of phosphorus sulfide; the reaction is carried out in from about one to about ten hours. It is preferable to use an amount of the phosphorus sulfide that will completely react with the hydrocarbon so that no further purification is necessary; however, an excess of the phosphorus sulfide can be used, and the unreacted material separated by filtration. The reaction, if desired, can be carried out in the presence of a sulfurizing agent such as sulfur or a halide of sulfur as described in U.S. 2,316,087, issued to J. W. Gaynor et al. April 6, 1943. It is advantageous to maintain a non-oxidizing atmosphere, for example as atmosphere of nitrogen, in the reaction vessel.

The reaction product obtained can be hydrolyzed, if desired, at a temperature of from about 200° F. to about 500° F., preferably at a temperature of about 300° F. to 400° F. by suitable means, such as for example, by introducing steam through the reaction mass. The hydrolyzed product, containing inorganic phosphorus acids formed during the hydrolysis, can be used as such in the subsequent neutralization stage; or it can be substantially freed of the inorganic phosphorus acids by contacting with an adsorbent material such as Attapulgus clay, fuller's earth and the like, at a temperature of 100° F. to 500° F. as fully described and claimed in U.S. 2,688,612, issued to R. Watson September 7, 1954, or by extraction with phenol or an alkanol of 1 to 5 carbon atoms in admixture with water as described and claimed in Lemmon et al. U. S. Patent No. 2,843,579, issued July 15, 1958.

Either the hydrolyzed or non-hydrolyzed phosphorus sulfide-hydrocarbon reaction product can be neutralized with a basic alkaline earth metal compound to form detergents suitable for use in accordance with the present process.

Useable alkaline earth metal sulfonates can advantageously be prepared by neutralization of a sulfonic acid with a basic alkaline earth compound. The sulfonic acids are well known to those skilled in the art; especially useable are the preferentially oil-soluble sulfonic acids and preferably the petroleum sulfonic acids. The sulfonic acids include the mahogany sulfonic acids, unsaturated paraffin wax sulfonic acids, petrolatum sulfonic acids, monoparaffin wax-substituted naphthalene sulfonic acids, diparaffin wax-substituted phenol sulfonic acids, wax sulfonic acids, petroleum naphthalene sulfonic acids, fuel oil substituted-benzene sulfonic acids (synthetic alkyl aryl sulfonic acids), diphenyl ether sulfonic acids, diphenyl ether disulfonic acids, naphthalene disulfide sulfonic acids, naphthalene disulfide disulfonic acids, diphenyl amine disulfonic acids, diphenyl amine sulfonic acids, thiophene sulfonic acids, alpha-chloronaphthalene sulfonic acids, cetyl chlorobenzene sulfonic acids, cetyl-sulfonic acids, cetyl-phenol disulfide sulfonic acids, cetyl-phenol monosulfide sulfonic acids, cetoxy capryl-benzene sulfonic acids, di-cetyl thianthrene sulfonic acids, di-lauryl beta naphthol sulfonic acids, di-capryl nitro-naphthalene sulfonic acids; hydroxy substituted paraffin wax sulfonic acids, tetra-isobutylene sulfonic acids, tetra-amylene sulfonic acids, chloro-substituted paraffin wax sulfonic acids, nitroso paraffin wax sulfonic acids, cetyl-cyclopentyl sulfonic acids, lauryl-cyclo-hexyl sulfonic acids, mono- and polywax substituted cyclohexyl sulfonic acids, etc. Other useable oil-soluble sulfonic acids are well described in the art, for example, see U.S. 2,616,904; U.S. 2,626,207 and U.S. 2,767,209.

The sulfonic acids may be derived from various petroleum fractions such as gas oil, kerosene, light oil, turbine oil, mineral lubricating oil, heavy oil petroleum waxes (e.g., petrolatum paraffin wax and mixtures of various hydrocarbon wax fractions), etc.

For example, useable sulfonic acids may be produced in the acid treatment of petroleum mineral oil fraction such as mineral lubricating oil fractions with such agents as sulfuric acids or chlorosulfuric acids. The petroleum sulfonic acids are well known to the art. Such petroleum sulfonic acids normally contain sulfonated aromatic constituents. They can be obtained, for example, by treating any normally liquid aromatic hydrocarbon-containing petroleum fraction with concentrated sulfuric acid or sulfur trioxide. A more particular petroleum sulfonic acid which is useable in this invention is the petroleum sulfonic acid obtained by sulfonating an aromatics-containing solvent extract from a 40-weight lubricating oil. Such sulfonation can be effected by treating the extract with sulfur trioxide or concentrated sulfuric acid. Petroleum sulfonic acids derived from lubricating oil stocks generally have a molecular weight within the range of from about 400 to about 700. Such sulfonic acids are oil-soluble and are commonly called "mahogany acids" as distinguished from the water-soluble "green acids." Although the green acids are not acceptable when used alone, in forming the complexes of this invention, they may sometimes be used in admixture with the mahogany acids with acceptable results. Sulfonation of an aromatics-containing fraction produces a sulfonic acid-containing composition known in the art as "sour oil." Although the sulfonic acids are normally extracted from "sour oil" before use, in the process of this invention the "sour oil" may be used directly without extraction, as the sulfonic acid component of the reaction mixture, for convenience and elimination of the necessity for extraction.

The preferred sulfonic acids are the "sour oils" described above. Also advantageous are the alkyl benzene sulfonates including sulfonated mono-, di- and poly-alkyl benzenes obtained by sulfonation of aromatic hydrocarbons containing alkyl benzenes generally having molecular weights in the range of from about 100 to about 200.

Other detergency addition agents such as the alkaline earth metal phenates are also useable. Such detergents are well known to those in the art.

In a particular embodiment of the present process, the alkaline earth metal oxide and detergent mixture is prepared concurrent with the neutralization of an acidic component, e.g. sulfonic acid or phosphorus sulfide-hydrocarbon reaction product, by the addition of an excess of alkaline earth metal oxide or other basic alkaline earth metal compound during the neutralization step in forming the detergent. In an especially useful aspect of this embodiment, the neutralization of the acid is carried out as a step in a combination process which includes the neutralization reaction itself and the neutralization is carried out in the presence of an excess of the basic compound, thereby providing alkaline earth metal oxide in combination with the neutalized detergent for treatment in a subsequent step with carbon dioxide and ammonia. The carbamates are formed as set out above and the alkaline earth metal carbamate is then decomposed to complete the formation of alkaline earth metal carbonate for reserve alkalinity in the detergency addition agent. The neutralization reaction temperatures are well known to the art, e.g. 100 to 400° F.

It is to be understood that diluents, e.g. light mineral lubricating oil and the like, can be used in any one or more of the steps of the present process for the purpose of decreasing viscosities of reaction mixtures.

The process steps for formation of the carbamates, and ultimately the alkaline earth metal carbonate involve the formation of such carbamates and carbonate in situ within the mixture of detergent and alkaline earth metal oxide. Although we do not intend to be limited by any particular theory regarding the achievement of reserve alkalinity within the detergent, it is believed that the ammonia and carbon dioxide react in situ to form ammonium carbamate which in turn reacts with the alkaline earth metal oxide in the presence of sufficient water to hydrolyze the oxide and the alkaline earth metal carbamate is then formed. The alkaline earth metal carbamate is then thermally decomposed in the presence of water to produce the finely divided alkaline earth metal carbonate dispersed within the detergent and providing the reserve alkalinity.

The reaction conditions for carbamate formation are such as to maintain water in the liquid state, i.e. above 32° F., for hydrolysis of the alkaline earth metal compound. Further, the reaction is carried out below the decomposition temperature of ammonium carbamate in the presence of water, e.g. below about 160–180° F. The preferred temperature range for the reaction is from about 60° F. up to about 110° F. although lower or higher temperatures can be used. The reaction is slightly exothermic; for example, is a thin-walled non-insulated vessel under ambient temperatures average about 70° F. during the reaction, the temperature of the reaction mixture may increase to about 110° F. or higher before completion of the reaction.

Thus, the process of this invention involves treating the mixture of alkaline earth metal oxide and detergent or other gas permeable substance with gaseous carbon dioxide and ammonia under conditions as set out above. The gaseous carbon dioxide and ammonia may be added as separate streams or as a mixture and the ammonia can be added either concurrent with or before the carbon dioxide. However, the carbon dioxide should not be added prior to the ammonia for good carbamate formation. A solvent for the ammonia, carbon dioxide and alkaline earth metal oxide can advantageously be used during the treating step. Such solvents include the oxygen-containing organic solvents such as alkanols, e.g. methanol, ethanol, isopropyl alcohol and the like. Preferably the solvent boils below about 250° F. so that it can subsequently be readily separated from the overbased product. Of course, water is used during the treating step at least in amounts sufficient to hydrolyze the alkaline earth metal compound to the hydroxide. During the treating step, a total of 2 moles of carbon dioxide and 2 moles of ammonia are theoretically used in forming the alkaline earth metal carbamate and upon decomposition of the carbamate, 2 moles of ammonia and one mole of carbon dioxide are theoretically released. The ammonia and carbon dioxide can be recovered and reused. During the treating step, especially where higher rates of addition of the carbon dioxide and ammonia are employed, ammonia and carbon dioxide bubbling through the reaction mass can be recovered and recycled for reuse. However, at lower rates of addition, e.g. 1 to 2 moles per hour per mole of detergent, very little if any carbon dioxide and ammonia will proceed completely through a normal reaction mass, e.g. in a sizeably deep kettle, to warrant its collection and recycle.

The rates of addition of the gases to the reaction mass are not critical and it is intended that any rates can be used, e.g. .1 to 50, or more or less, moles per hour per mole of detergent. Carbamate formation is usually complete within a period of one to three hours, although, of course, rates of addition of the gases exert some direct controlling effect upon the rate of reaction.

After treatment with carbon dioxide and ammonia, the alkaline earth metal carbamate is thermally decomposed in the presence of an equimolar amount of water based on calculated alkaline earth metal carbamate. Addition of the water used in decomposition at lower temperatures can cause formation of very thick emulsions which are undesirable. If such emulsions are found to occur with the particular detergent used in the process, the reactants should be heated to a temperature at which such emulsions do not occur, e.g. 110° F. in the case of certain detergents with which we have worked. The water is then added at the increased temperature and the reaction mass is further heated for decomposition of the carbamate. The decomposition temperature in the presence of water is usually above 150° F. under most reaction mixture conditions and convenient decomposition temperatures will usually fall within the range of 160–220° F. Such temperatures within this range and up to 250° F. or slightly higher are preferred because they permit removal of solvent and water at the time of carbamate decomposition by distillation of solvent and water from the reaction mixture. If the solvent boils below the boiling point of water, it is preferred that an azeotrope former, e.g. toluene, benzene, heptane and other well known azeotroping agents, capable of forming an azeotrope with water be added to the reactants to assist in distilling the water overhead. If the solvent boils above the boiling point of water, it may be advantageous to add azeotrope formers for both the water and the solvent to lower the temperature of separation to a more conveniently attainable temperature. Initiation of the decomposition of the alkaline earth metal carbamate during the decomposition step is evidenced by an increase in the evolution of ammonia and carbon dioxide and completion of decomposition is evidenced by a marked decrease in such evolution. The involved gases can be recovered and reused, e.g. by recycling or charging directly to another reactor in alternate series flow which other reactor is being used for carbamate formation concurrently with decomposition of the carbamate in the first reaction zone.

Upon separation of the solvent and water by distillation, the resulting overbased product can be filtered if desired by heating to a temperature in the range of 250–400° F. and filtering through diatomaceous earth to remove unreacted alkaline earth metal oxide and the less finely divided alkaline earth metal carbonate should any be formed during the process.

The following examples are offered by way of illustration of the present process.

*Example I*

A hydrolyzed phosphorus pentasulfide-butylene polymer reaction product (prepared by reacting a butylene polymer having a molecular weight of about 780 with 15.5 weight percent $P_2S_5$ at about 450° F. for about 5.5 hours and hydrolyzing the resulting product by steaming at 300° F. for about 5.5 hours) was diluted to about 1.35% phosphorus with SAE 5 mineral lubricating oil. The diluted reaction product (containing one mole of acid based on phosphorus) was mixed with 3 moles of calcium oxide, 7.5 moles of water and 18 moles of ethanol and the resulting mixture was refluxed (about 180° F.) for one hour. The temperature was then reduced to about 50° F. and the mixture was saturated with ammonia by blowing for one hour at a rate of 1.8 cu. ft. per hour. Sufficient carbon dioxide was then bubbled into the reaction mixture to render the mixture neutral to phenol phthalein. The carbon dioxide was added at a rate of 0.6 cu. ft. per hour for three hours. The product was then heated to 180° F. and 3 moles of water were added to decompose the calcium carbamate. The product was then heated to 340° F. and filtered through Celite (diatomaceous earth). The filtered product contained 3.3 weight percent calcium and 1.23 weight percent phosphorus and had a molar ratio of calcium to phosphorus of about 2:1.

*Example II*

1260 g. (0.5 mole) of sulfonated solvent extract from 40-weight oil (a sour oil containing about 23.8% sulfonic acid of about 600 molecular weight), 300 cc. methanol and 140 g. of calcium oxide (2.5 moles) were mixed and heated for one hour at 160° F. The resulting mixture of neutralized sulfonic acid and calcium oxide was cooled to 80° F. and carbon dioxide and ammonia were simultaneously added each at a rate of 1.8 cu. ft. per hour for 1.5 hours. The reactants were then heated to 150° F. and 54 cc. water were added. Thereafter, the mixture was gradually heated to 212° F. (until evolving ammonia was no longer detected by red litmus). The product was then heated to 350° F. and filtered through Celite. The filtered product contained 4.2% calcium and had a molar ratio of calcium to sulfonic acid of about 2.8:1.

Preparations in accordance with Example II were made using the same reactants and the same conditions with the exception that the addition of carbon dioxide and ammonia was continued for a period of 2.5 hours. Products thusly prepared had calcium to sulfonic acid molar ratios in the range of 3.5:1 to 4.5:1.

*Example III*

1260 g. of the sour oil used in Example II (0.5 mole) were diluted with 150 g. of SAE 5 mineral lubricating oil and mixed with 3 moles of calcium oxide, 15 moles of ethanol and 3 moles of water. The mixture was heated to reflux temperature (180° F.) for one hour. The mixture was cooled to 80° F. and carbon dioxide and ammonia were concurrently added each at a rate of 1.8 cu. ft. per hour for 1.5 hours. The product was slowly heated to 150° F. over a period of one hour and 6 moles of water were added. Additional carbon dioxide was then added at a rate of 0.6 cu. ft. per hour at one hour while the product was heated to 190° F. to remove water, ammonia and ethanol. Sufficient toluene was added to azeotrope the water not removed by the ethanol and heating was continued to remove the water by azeotroping. The product was then heated to 350° F. and filtered through Celite. The filtered product contained 7.1% calcium and 0.034% nitrogen. The mole ratio of calcium to sulfonic acid was about 4.5:1.

*Example IV*

About 1250 g. of sour oil used in Example I was mixed with 170 g. of calcium oxide, 1,000 cc. of methanol and 50 cc. water. The mixture was refluxed for two hours (about 155° F.). The mixture was then cooled to room temperature (about 70° F.) and blown with ammonia for one-half hour at a rate of 1.2 cu. ft. per hour. Thereafter, the reactants were blown with carbon dioxide for one-half hour at a rate of 1.2 cu. ft. per hour. The reaction mass was then heated to 140° F. and 150 cc. water was added. Heating was continued (whereby methanol, water, ammonia and carbon dioxide were evolved) to 340° F. and the product was filtered through Celite. The filtered product contained 5.8% calcium, equivalent to 4.1 moles of sulfonic acid.

It is evident from the foregoing that we have provided a method for increasing the alkalinity of compositions, which method is particularly useful in providing detergents with alkaline reserve.

We claim:

1. A method of increasing the alkalinity of a composition which is permeable to gases and which is miscible with alkaline earth metal oxides, which comprises:
   admixing said composition with a member of the group consisting of alkaline earth metal oxides and hydroxides,
   introducing gaseous carbon dioxide and ammonia into said admixture at a temperature below the decomposition temperature of ammonium carbamate,
   and heating the resulting mixture in the presence of water to a temperature sufficient to convert the ammonium carbamate to an alkaline earth metal carbamate, and thence to convert the alkaline earth metal carbamate to the alkaline earth metal carbonate.

2. The method of claim 1 wherein said composition is a detergency addition agent for lubricant oils.

3. The method of claim 2 wherein said detergency addition agent is a calcium neutralized, hydrolized, phosphorous sulfide-hydrocarbon reaction product.

4. The method of claim 2 wherein said detergency addition agent is calcium sulfonate.

5. The method of claim 1 wherein said member is calcium oxide.

6. The method of claim 1 wherein said member is calcium hydroxide.

7. The method of claim 1 wherein said ammonia is introduced prior to said carbon dioxide.

8. The method of claim 1 wherein said temperature of introducing gaseous carbon dioxide and ammonia is below about 160–180° F.

9. The method of claim 1 wherein said heating is effected at a temperature above 150° F.

10. The method of claim 1 including the step of heating the final mixture to 250–400° F. and thereafter filtering the mixture.

References Cited in the file of this patent

UNITED STATES PATENTS

| | | |
|---|---|---|
| 2,924,617 | Wright | Feb. 9, 1960 |
| 2,931,773 | Thompson et al. | Apr. 5, 1960 |
| 3,027,325 | McMillen et al. | Mar. 27, 1962 |